United States Patent [19]
Shibata et al.

[11] 3,943,421
[45] Mar. 9, 1976

[54] FOOD PROCESSING CONTROL APPARATUS

[75] Inventors: Morio Shibata, Amagasaki; Fujio Sawamura; Kunio Funatsu, both of Toyonaka, all of Japan

[73] Assignee: Matsushita Electric Industrial Company, Ltd., Osaka, Japan

[22] Filed: July 11, 1973

[21] Appl. No.: 378,133

[30] Foreign Application Priority Data
July 12, 1972 Japan................................ 47-70143
Nov. 7, 1972 Japan...................... 47-128504[U]

[52] U.S. Cl. ... 318/484; 259/DIG. 19; 259/DIG. 35; 318/272; 318/305
[51] Int. Cl.²........................................... H02P 7/00
[58] Field of Search............................... 200/33–38; 99/324, 325, 327, 331, 332, 334, 335, 337, 342, 343, 348, 378; 259/DIG. 17, DIG. 18, DIG. 19, DIG. 35; 219/435, 441, 442, 448–452, 482, 487, 506, 489; 318/268–272, 305, 445, 446, 452, 456, 458, 461, 466, 484; 235/61 A; 310/68 R–68 B

[56] References Cited
UNITED STATES PATENTS

| | | | |
|---|---|---|---|
| 2,550,281 | 4/1951 | Martin | 318/466 |
| 2,610,314 | 9/1952 | Morse | 318/268 |
| 2,671,191 | 3/1954 | Braski | 259/DIG. 19 UX |
| 2,847,199 | 8/1958 | Gasparotti | 318/466 |
| 2,856,507 | 10/1958 | Naxon | 99/342 X |
| 2,905,452 | 9/1959 | Appleton | 99/348 UX |
| 2,912,633 | 11/1959 | Nebinger et al. | 318/268 |
| 2,955,186 | 10/1960 | Ritter | 219/435 X |
| 2,984,755 | 5/1961 | Anastasia | 318/452 X |
| 3,299,226 | 1/1967 | Edwards | 259/DIG. 35 UX |
| 3,731,059 | 5/1973 | Willson | 99/325 UX |

Primary Examiner—James R. Scott
Attorney, Agent, or Firm—Stevens, Davis, Miller & Mosher

[57] ABSTRACT

A cooking utensil provided with a device for selecting a rotational speed of the cooking utensil such as a mixer, a device for selecting a processing time thereof and an indicating device therefor in which when one of the names of food marked upon the indicating device is selected, a rotational speed or processing time for optimum processing of ingredients of a selected food may be automatically set.

9 Claims, 27 Drawing Figures

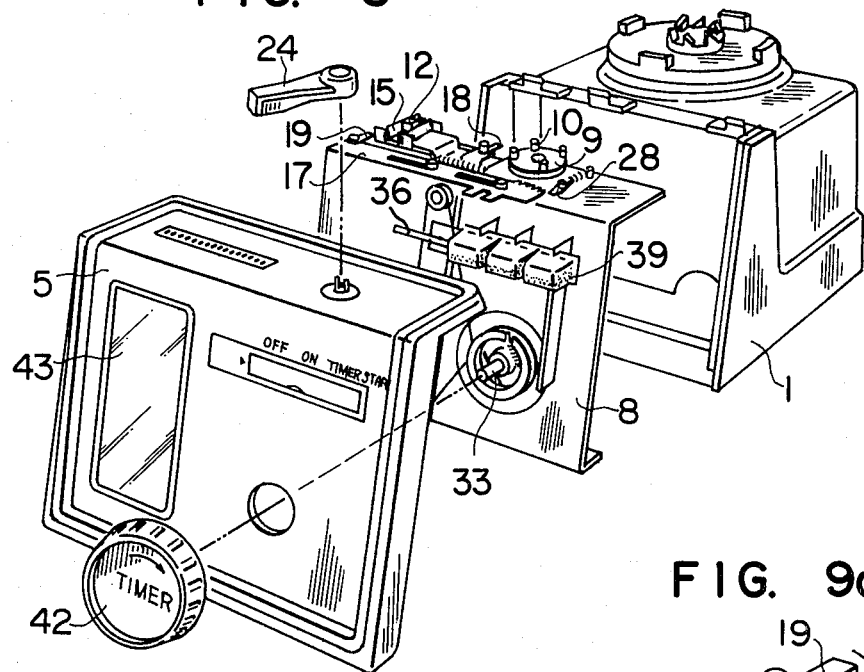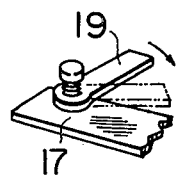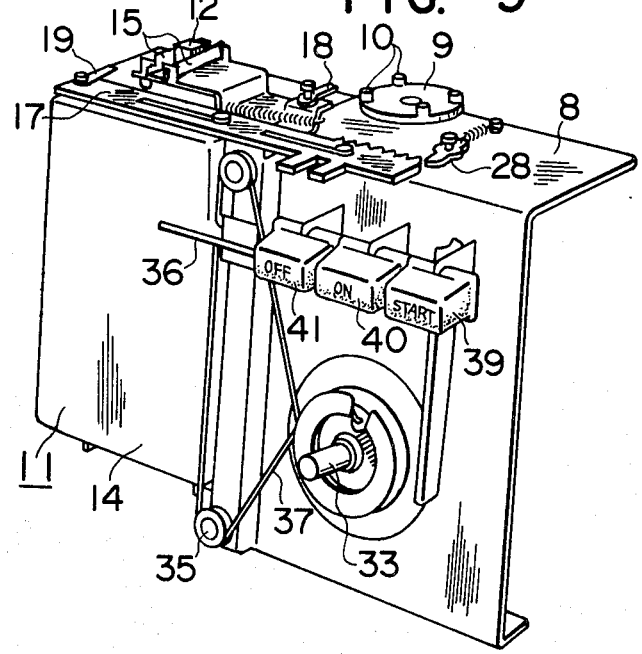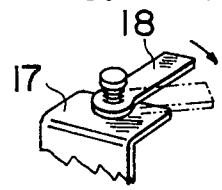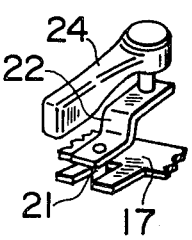

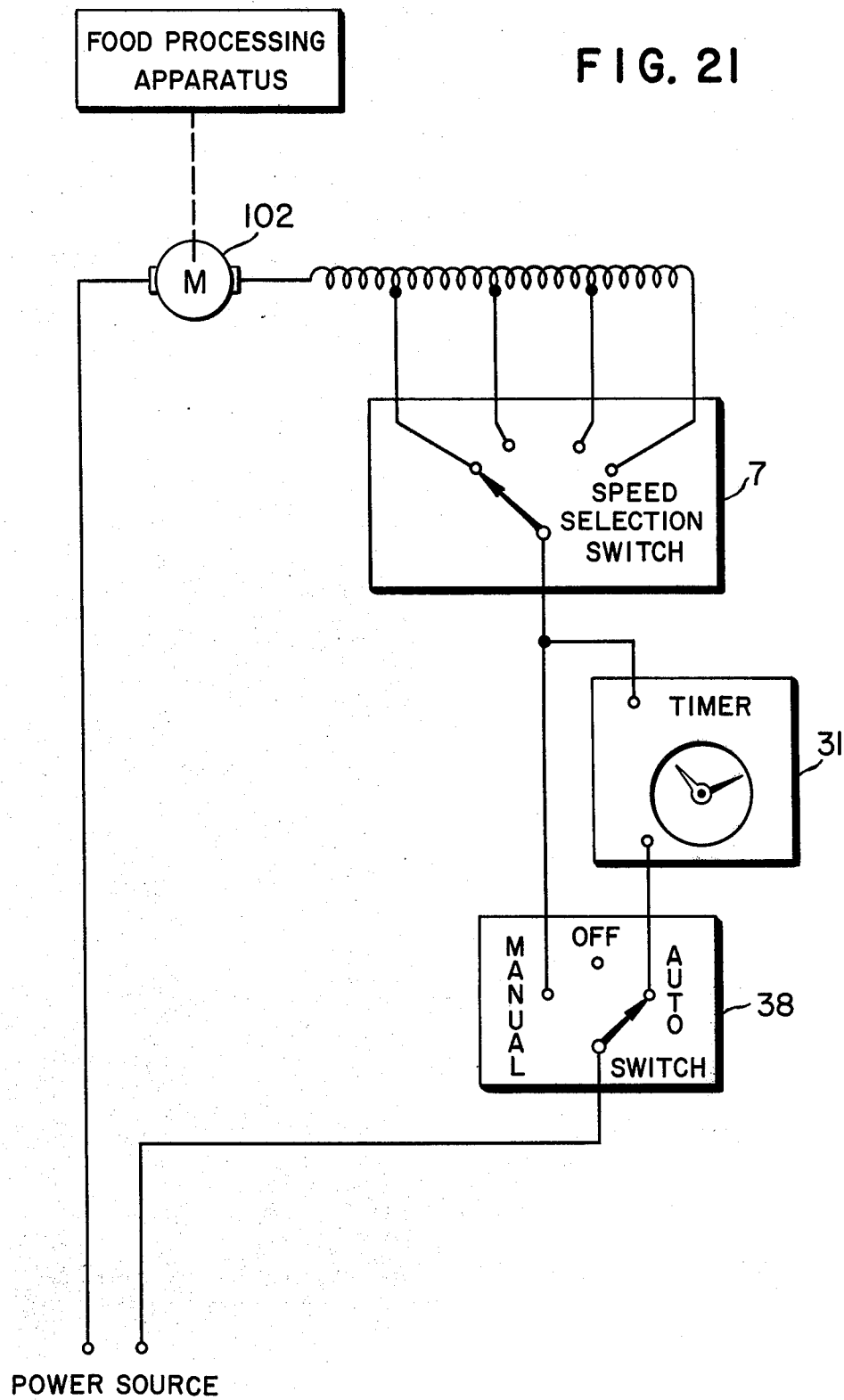

FOOD PROCESSING CONTROL APPARATUS

BACKGROUND OF THE INVENTION

In general a speed of a motor for driving a cooking utensil such as a mixer is varied depending upon ingredients to be processed. However in the conventional cooking only the indication of rotational speeds such as "high, medium and low" or "numerals from 1 to 10" are marked upon the casing thereof. Therefore the speed of the cooking utensil must be selected depending upon an optimum speed found in a cookbook or the like for ingredients to be processed. However, this method is very cumbersome so that the ingredients are often processed at a random speed. Furthermore a cooking utensil in which two variables such as rotational speed and processing time can be controlled is known. However, these two controlled variables are generally independently marked upon the casing of the cooking utensil so that the correlation between these two controlled variables cannot be seen. The two controlled variables must be also selected with reference to a cookbook. This method is further very cumbersome.

SUMMARY OF THE INVENTION

The present invention was made to overcome the defects encountered in the conventional cooking utensils.

A first object of the present invention is therefore to provide a cooking utensil in which when a user selects one of various modes of processing the ingredients, operation of the cooking utensil according to the selected mode may be automatically obtained.

A second object of the present invention is to provide a cooking utensil which may be used in a very simple manner by correlating the rotational speed and processing time indications based upon food to be prepared. One of the surfaces of an indicator indicating a name of food to be prepared is selected by rotating operating means such as a change lever, and then a pointer is moved by an operating knob to indicate the name of food on the surface. Then the optimum rotational speed and processing time for a selected food are automatically set. Therefore the cumbersome operation for setting an optimum rotational speed and processing time with reference to a cookbook may be eliminated, and the cooking utensil of the present invention may be used in a very simple manner. In other words, the second object of the present invention is to provide a cooking utensil which has the functions of a cookbook which is a soft ware of the cooking utensil, and in which the rotational speed and the processing time are correlated with each other based upon food to be prepared.

A third object of the present invention is to provide an arrangement for establishing one-to-one correspondence between the variation in the rotational speed of an electric motor and the change-over of the indicating surfaces of an indicator. By every operation of a change lever, an indicator may be rotated through 360°/n in synchronism with a selection switch. Means is provided to ensure the positive and quick rotation of the indicator through 360°/n and the change-over of the selection switch, whereby their erratic operations may be prevented.

A fourth object of the present invention is to provide a mechanism which may establish one-to-one correspondence between the change-over of a selection switch and the rotation of an indicator through a predetermined angle. The change-over of the selection switch and the rotation of the indicator cannot be accomplished unless a slider makes one complete reciprocation so that the rotation of the indicator or the change-over of the selection switch can be prevented when the change-over of the selection switch or the rotation of the indicator is not made.

A fifth object of the present invention is to eliminate means for interconnecting between a selection switch for selecting a speed of a motor and an indicator for indicating names of food to be prepared, to obtain the reliable direct coupling between the selection switch and the indicator by simple means, and to reduce the cost by eliminating the interconnection means and the coupling means.

A sixth object of the present invention is to provide a cooking utensil in which an indicator is rotated through a predetermined angle in synchronism with a selection switch when means is operated such that a selected indicating surface is correctly brought to a position where it can be seen.

A seventh object of the present invention is to mount a selection switch, an indicator and their associated parts upon a control panel attached to the front side of a casing of a cooking utensil, thereby facilitating the assembly, adjustment and repair thereof.

The above and other objects, features and advantages of the present invention will become more apparent from the following description of some preferred embodiments thereof taken in conjunction with the accompanying drawing.

BRIEF DESCRIPTION OF THE DRAWING

FIG. 8 is a perspective exploded view of three sections of the first embodiment shown in FIG. 1;

FIG. 9 is a perspective view of an indicating device disposed within a casing;

FIG. 9a is a view illustrating, on enlarged scale, a lever 19 shown in FIG. 9;

FIG. 9b is view illustrating, on enlarged scale, a lever 18 shown in FIG. 9;

FIG. 9c is a view illustrating, on enlarged scale, a change lever 24 shown in FIG. 8;

FIGS. 19 and 20 are a side view and a perspective view illustrating a variation of a mechanism shown in FIGS. 17 and 18 and FIG. 21 is a block diagram of the electrical circuit of this invention.

DESCRIPTION OF THE PREFERRED EMBODIMENTS

First Embodiment, FIGS. 1 – 10

Figure 1:
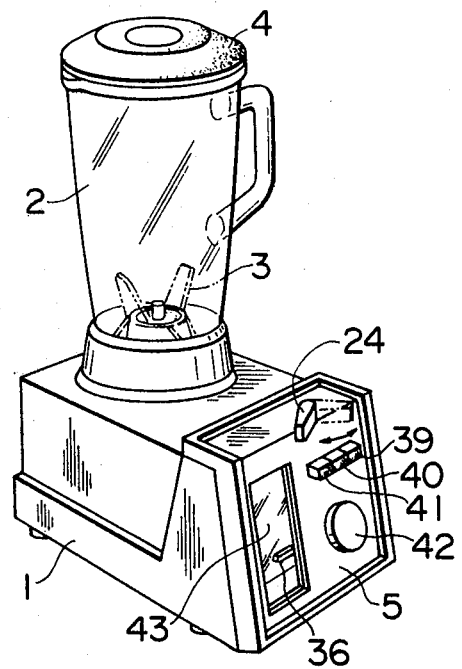
FIG. 1 is a perspective view of a first embodiment of the present invention.
Figure 3:
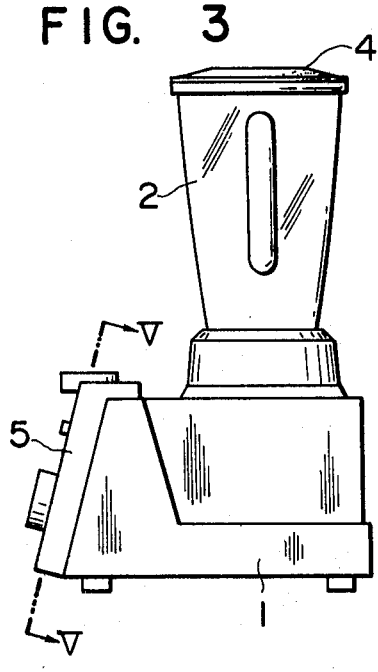
FIG. 3 is a side view thereof.
Figure 2:
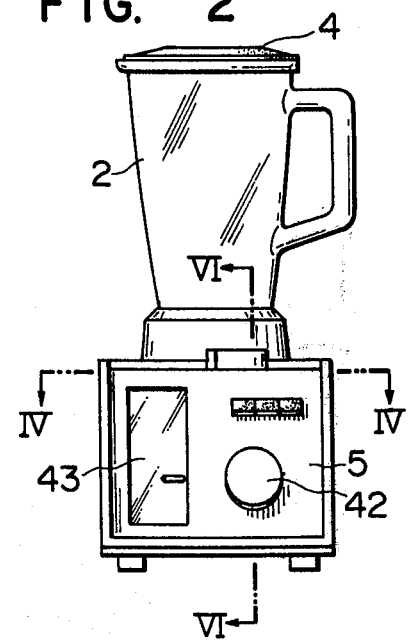
FIG. 2 is a front view thereof.
Figure 4:
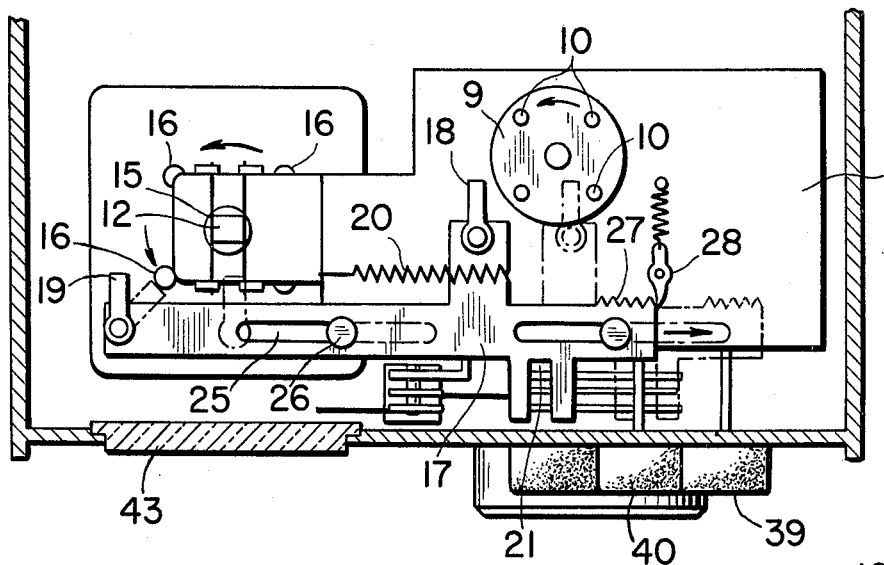
FIG. 4 is a sectional view taken along the line IV — IV of FIG. 2.

Referring to FIGS. 1 – 10, the first embodiment of the present invention will be described hereinafter. Upon a casing 1 incorporating therein a motor (not shown) is detachably mounted a cup 2 for receiving ingredients to be processed and a cutter 3 is disposed within the cup 2 and adapted to be coupled to the motor disposed within the casing 1. When the ingredients are processed, the cup 2 is closed with a top cover 4. Upon a control panel 5 attached to the front side of the casing 1 are disposed means for controlling the rotational speed and processing time of the motor and means for indicating them. Reference numeral 6 denotes a plate covering the bottom of the casing 1.

Figure 6:
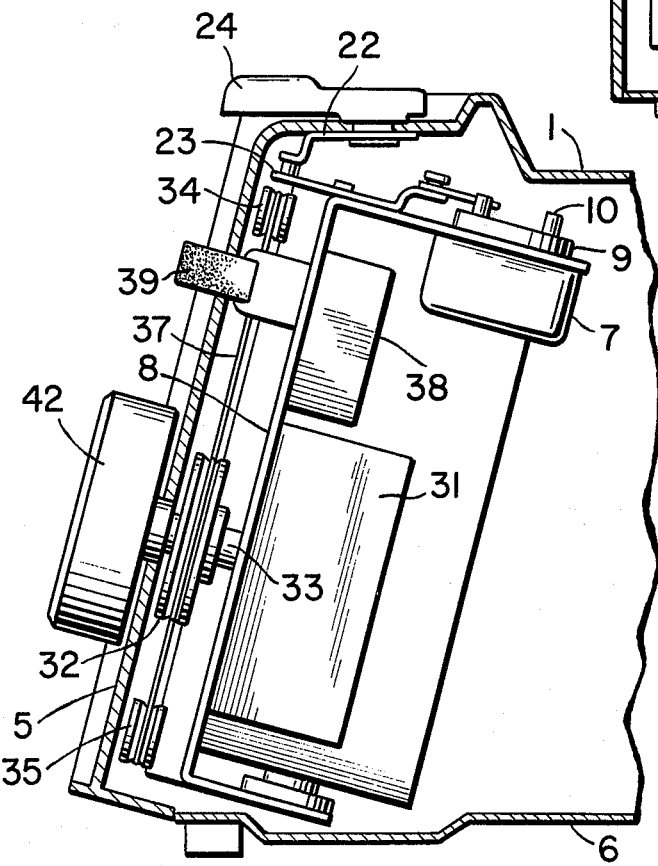
FIG. 6 is a sectional view taken along the line VI — VI of FIG. 2.

A rotary type selection switch 7 for selecting one of the four rotational speeds of the motor is fixed to a frame 8 disposed within the casing 1 as best shown in FIG. 6. In the instant embodiment, the rotary switch 7 has been described as being used to select one of the four speeds, but it will be understood that the switch may be designed to vary in any number of steps as needs demand. Upon an actuating disk 9 fixed to the operating shaft of the rotary switch 7 are equiangularly disposed actuating pins 10, the number of which corresponds to the steps of the speed of the motor. An indicator comprising quadrangular prism 11 having four indicating side surfaces 14 is rotatably supported by the frame 8 with rotary shafts 12 and 13. The upper portion of the rotary shaft 12 has a square cross sectional configuration as in the case of the indicator 11 and is sandwiched by a pair of leaf springs 15 so as to ensure the stepwise rotation of the indicator 11. The indicator 11 is provided with actuating pins 16 corresponding to the four actuating pins 10 on the actuating disk 9. A slider 17 is mounted on the frame 8 so as to be slidable in the longitudinal direction as best shown in FIG. 9, and is adapted to actuate the selection switch 7 and the indicator 11 simultaneously. That is, the slider 17 is provided with an actuating disk actuating lever 18 and an indicator actuating lever 19 which engage with the pins 10 of the actuating disk 9 and the pins 16 of the indicator 11, respectively, so as to rotate the actuating disk 9 and the indicator 11 through 90°. Therefore the speed of the motor is varied and the indicating surface 14 corresponding to the selected motor speed is displayed. When the slider 17 is displaced to the right in FIG. 4, the levers 18 and 19 are positioned at right angles to the direction of displacement of the slider 17, but when the slider is displaced to the left, they are caused to rotate in the clockwise direction. The levers 18 and 19 are rotated in the counterclockwise direction with respect to the slider 17, and stopper means are provided in order to stop their counterclockwise rotation at the position at a right angle to the slider 17. Therefore they are not rotated when the slider 17 is displaced to the right and engage with the pins 10 and 16, thereby causing the disk 9 and the indicator 11 to rotate through 90°. When the slider 17 is displaced to the left, the levers 18 and 19 engage with the pins 10 and 16 respectively, but are not in engagement with stopper means so that the actuating disk 9 and the indicator 11 remain in the same position and only the slider 17 is returned to the initial position. That is in response to one reciprocation of the slider 17, the selection switch 7 and the indicator 11 are rotated through 90° so that the motor speed and the display are varied. The slider 17 is normally biased to move to the left under the force of a spring 20 loaded between the frame 8 and the slider 17.

Figure 7A:
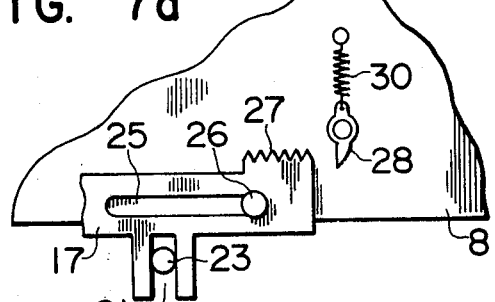
FIG. 7a–7d are views used for the explanation of operation of erratic indication preventive means.
Figure 7B:
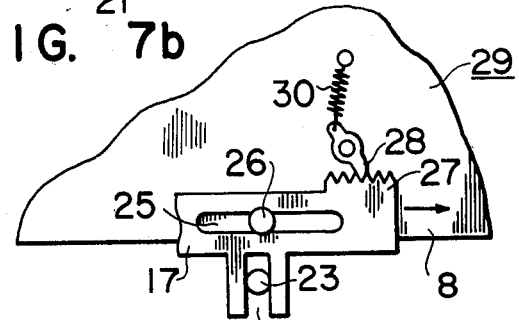
Figure 7C:
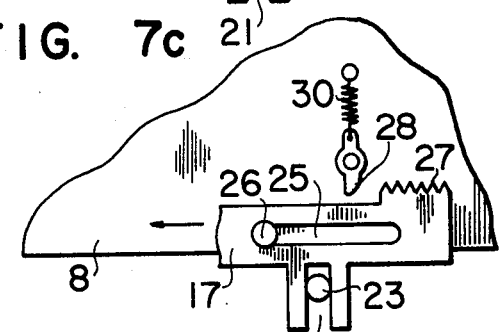
Figure 7D:
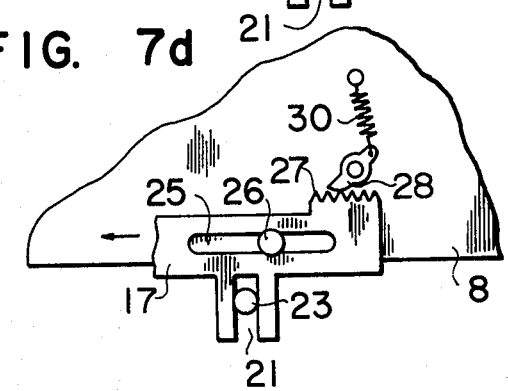
Figure 10:
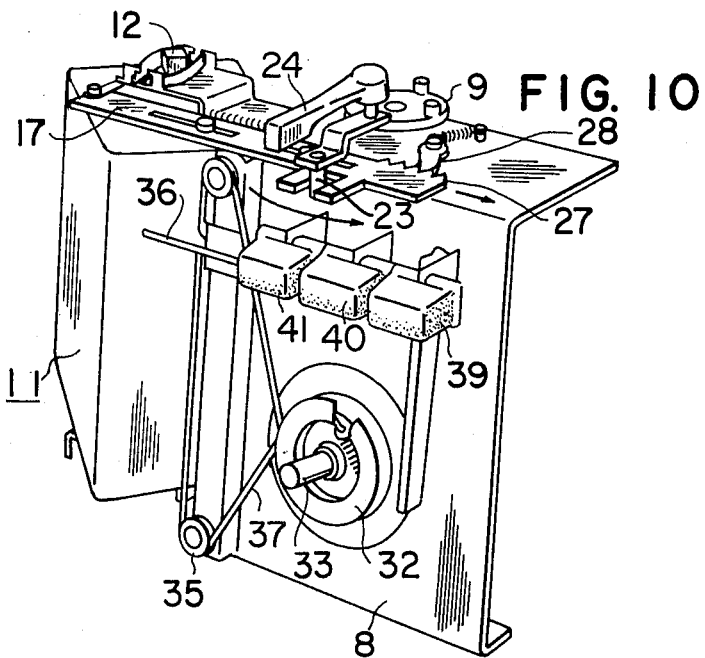
FIG. 10 is a perspective view illustrating the rotation of an indicator of the indicating device disposed within the casing.
Figure 11:
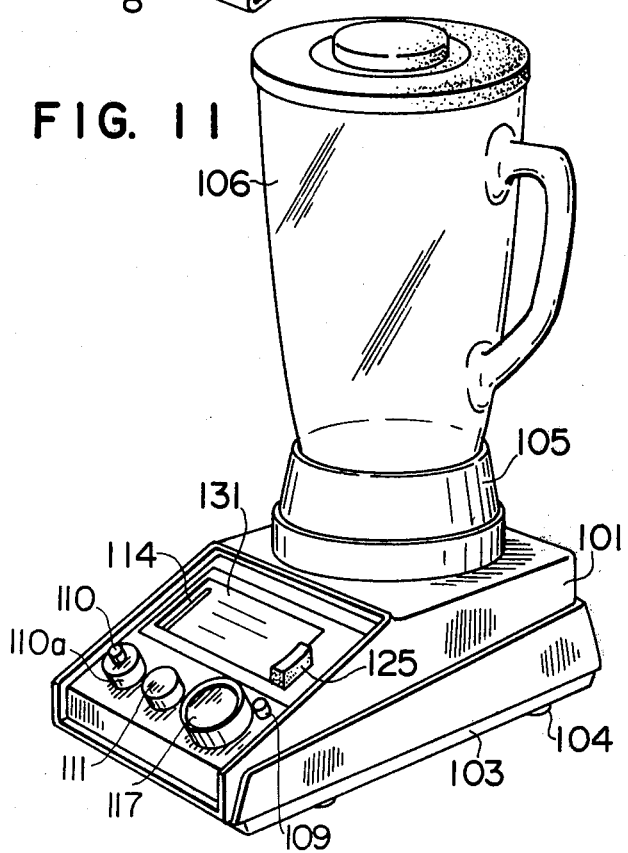
FIG. 11 is a perspective view of a second embodiment of the present invention.
Figure 12:
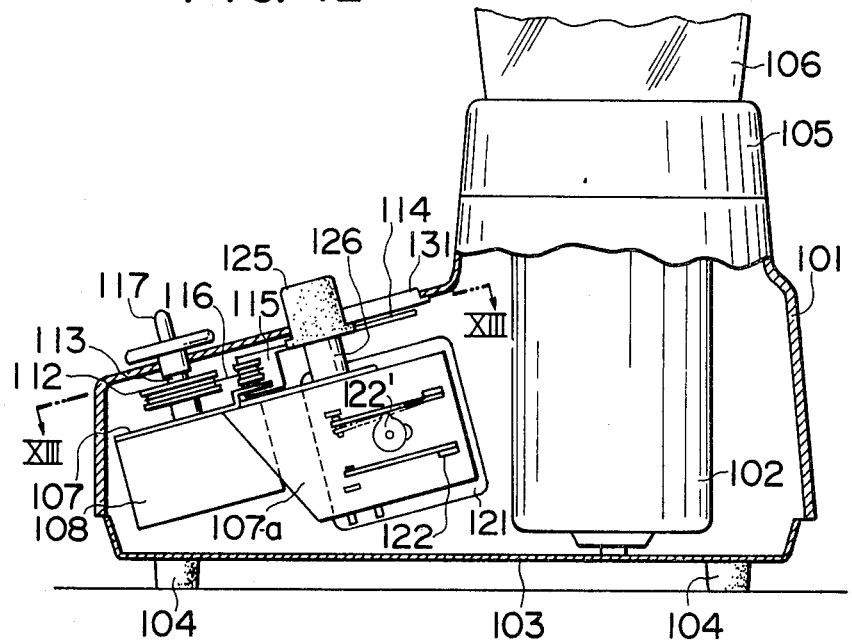
FIG. 12 is a side view, partly in section, thereof.
Figure 13:
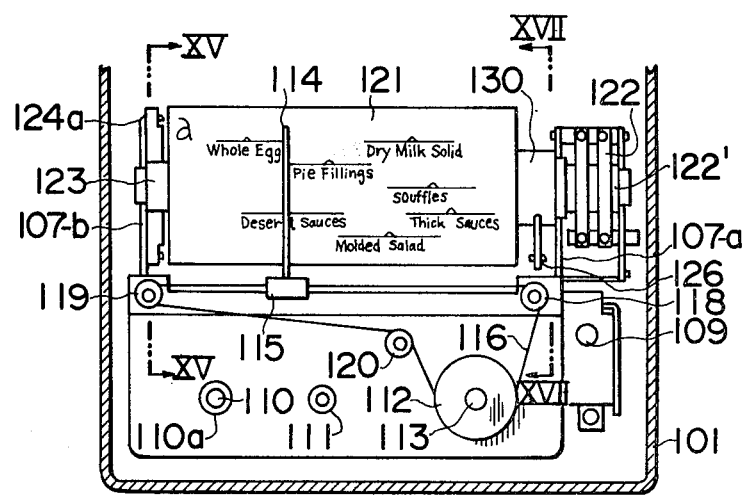
FIG. 13 is a sectional view taken along the line XIII XIII in FIG. 12.
Figure 14:
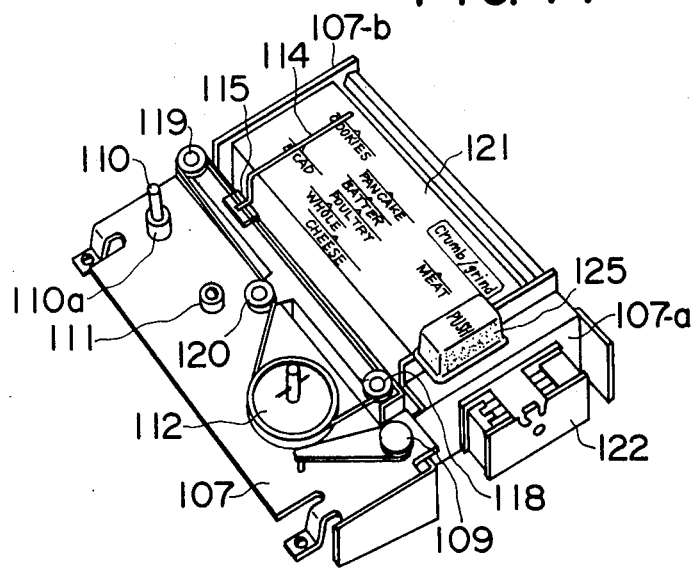
FIG. 14 is a perspective view thereof.

A bifurcated projection with a slot 21 is formed integral with the slider 17, and engages with a lever pin 23 of a lever 22 so that the slider 17 may be displaced. The lever 22 is fixed to the rotary shaft of a change lever 24 which in turn is rotatably fixed to the upper surface of the control panel 5 so that the lever 22 may be rotated in unison with the rotation of the change lever 24 which is manually operated. A stop 26 fixed to the frame 8 is fitted into an elongated slot 25 of the slider 17 so that the latter may be slidable upon the frame 8. As shown in FIGS. 7a–7d, teeth 27 are formed at the right upper end of the slider 17 and constitutes erratic indication preventive means 29 together with a pawl 28 in order to ensure the positive synchronous actuation of the selection switch 7 with the indicator 11. The pawl 28 is pivotably fixed to the frame 8 and is biased to be normally positioned at a right angle to the slider 17 under the force of a coiled spring 30 loaded between the pawl 28 and the frame 8. The pawl 28 engages with the toothed portion 27 of the slider 17 so as to prevent the reverse movement of the slider 17. When the slider 17 is displaced from the position shown in FIG. 7a to the position shown in FIG. 7b where the pawl 28 engages with the toothed portion 27, the pawl 28 rides over the teeth 27 as long as the slider 27 moves to the right. However when the slider 17 stops in the position shown in FIG. 7b, the spring 20 tends to return the slider 17 to the initial position, but the pawl 28 firmly engages with the teeth 27 so that the return of the slider 17 to the initial position may be prevented. Therefore in order to return the slider 17 to the initial position, it must be further displaced to the right so that the toothed portion 27 is moved completely past the pawl 28 pass as shown in FIG. 7c. Thereafter when the slider 17 is returned to the left, the pawl rides over the teeth 27 as shown in FIG. 7d so that the return to the initial position of the slider 17 is not prevented at all. The pawl 28 has a rectilinear left side and a curved right side so that the above operation of the pawl may be ensured.

Therefore, when the change lever 24 on the top of the control panel 5 is rotated from its initial position in the counter-clockwise direction and then stopped before it reaches its final position, the erratic indication preventive means 29 stops the displacement of the slider 17 in its half way so that the changeover of the selection switch 7 and the indicator 11 are not accomplished. In other words, unless the lever 24 is further rotated in the counter clockwise direction it is not permitted to return to its initial position so that the changeover of the selection switch 7 and the indicator 11 are not permitted. Therefore an erratic operation that the indicating surface 14 is not changed even when the selection switch 7 is changed over or vice versa may be prevented. That is, one to one correspondence between the rotations of the selection switch 7 and the indicator 11 may be secured.

Figure 5:
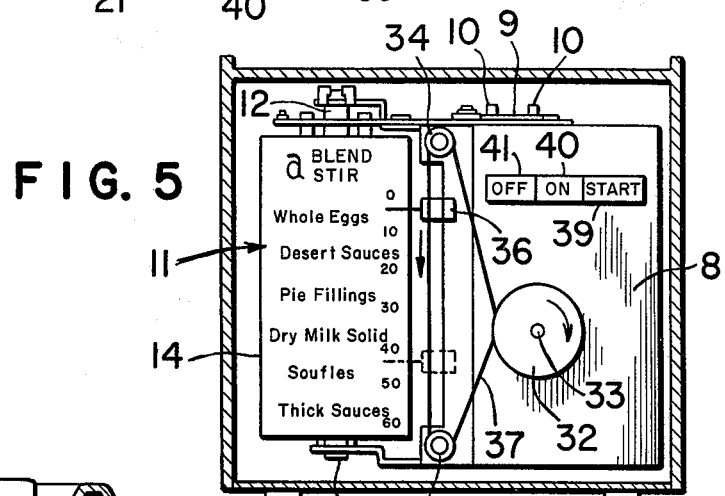
FIG. 5 is a sectional view taken along the line V — V of FIG. 3.

The setting time, that is a time interval the motor is driven is set by a timer 31 fixed to the frame 8 as shown in FIG. 6. A rope 37 passes over a rotary drum 32 fixed to the rotary shaft 33 of the timer 31, and a pair of vertically spaced apart pulleys 34 and 35 rotatably fixed to the frame 8 adjacent to the upper and lower ends of the indicator 11 as shown in FIG. 5. A pointer 36 is securely fixed to the rope 37 so as to move over the indicating surface 14 of the indicator 11 as the timer 31 is rotated, thereby indicating a setting time. Processing modes such as shearing and blending corresponding to the four speeds of the motor are marked upon the respective indicating surfaces 14 of the indicator 11 and foods such as dessert sauce, egg, etc. which may be prepared in one of the above precessing modes are marked upon the associated indicating surface 14 of the indicator 11 along the time axis such that each mark of food is arranged at a position corresponding to an optimum setting time of the motor for the food. For example when the timer 31 is set so that the pointer 36 indicates "Dessert Sauce", the ingredients are processed with the optimum speed of the motor and the optimum processing time. A switch 38 (See FIG. 6) has a contact for starting the timer 31 after it has been set and on-off contacts for starting and stopping the motor when the timer 31 is not used, and is operatively coupled to a "start" button 39, "on" button 40 and a "off" button 41. An operating knob 42 is fixed to the rotary shaft 33 of the timer 31 so as to control the timer 31 from the exterior of the control panel 5, and a transparent sheet 43 is attached to the control panel 5 to permit the observation of the indicating surface 14 of the indicator 11.

Next the mode of operation will be described. The cover 4 is removed from the cup 2, and the ingredients to be processed are charged into the cup 2. Next, if the ingredients should be blended, the change lever 24 is operated so that the indicating surface 14 with the marking of BLEND, STIR (See FIG. 5) may be viewed through the window of the control panel 5, and thereafter the knob 42 is rotated so that the pointer 36 indicates a desired food such as Dessert Sauce or the most similar to the desired food marked on the indicating surface 14. Then the start button 39 is depressed so that the motor starts driving to blend or stir the ingredients with an optimum speed and setting time. When the automatic blending is not required, the blending is continued for a desired time by depressing the "on" and "off" buttons 40 and 41.

Second Embodiment, FIGS. 11 – 18

Next the second embodiment of the present invention will be described with reference to FIGS. 11 – 16. Reference numeral 101 denotes a casing which houses a motor 102, a bottom plate 103, rubber legs 104, a cup receiving stand 105, a cup 106, a frame 107 upon which are mounted a timer 108, a timer start switch 109, an instant switch 110, a manual-off-auto switch 110a, and a continuous-intermittent selection switch 111. A pulley 112 is fixed to the shaft 113 of the timer 108 around pulley 112 is wrapped a rope 116 having a pointer guide 115. When a timer knob 117 fitted over the shaft 113 of the timer 108 is rotated, the timer 108 is wound up and the rope 116 which also passes over small pulleys 118, 119 and 120 is moved to bring a pointer 114 to a desired position.

Reference numeral 121 denotes an indicator which is a food guide drum and which is square in cross section and has four side surfaces marked with foods to be processed. The indicator 121 is supported between the frames 107a and 107b, and a rotary switch 122 for selecting the speeds of the motor 102 is disposed in coaxial relation with the indicator 121. Switch 122 consists of four contacts disposed two on each side of cam 122' mounted on shaft 123 and having two cam lobes spaced axially from each other and 90° apart to operate one contact of switch 122 for ecah 90° of revolution of indicator 121.

Figure 15:
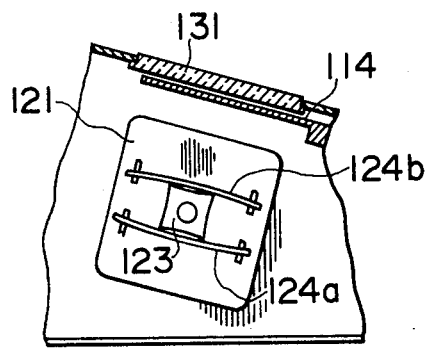
FIGS. 15 and 16 are views taken along the line XV XV in FIG. 13.
Figure 16:
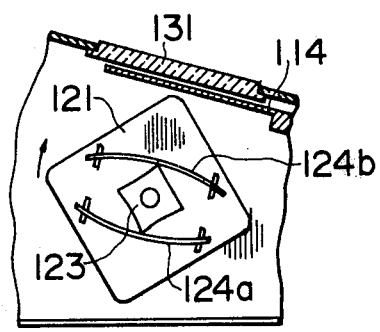
Figure 17:
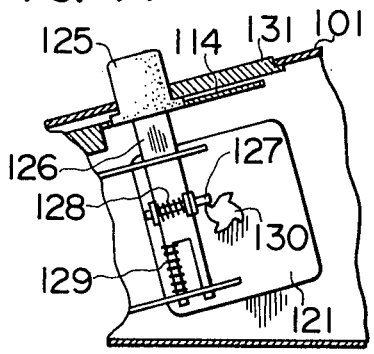
FIGS. 17 and 18 are views taken along the line XVII—XVII in FIG. 13.
Figure 18:
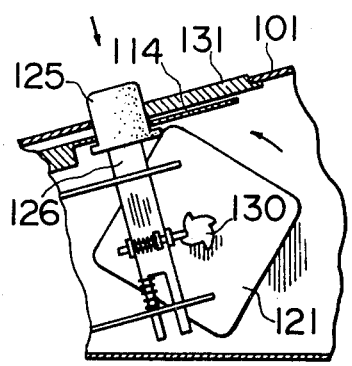

The shaft 123 of the indicator 121 has a square cross section as shown in FIGS. 15 and 16 and is sandwiched by a pair of leaf springs 124a and 124b so as to control the stepwise rotation of the indicator 121. FIGS. 17 and 18 show a pushbutton 125, a pushbutton lever 126, an actuating rod 127, and coiled springs 128 and 129. The pushbutton lever 126 is supported by the frame 107a (FIG. 14), and when the pushbutton 125 is depressed, the actuating rod 127 engages with a cam 130 fixed to the side surface of the indicator 121 so that the indicator 121 is rotated through 90°. When the pushbutton 125 is released after the indicator 121 has been rotated through 90°, the pushbutton lever 126 is returned to the initial position under the force of the coiled spring 129. When the pushbutton lever 126 is returned to the initial position and the actuating rod 127 engages again with the cam 130, the rod is moved back against the force of the coiled spring 128 so as to pass over the cam 130.

Figure 19:
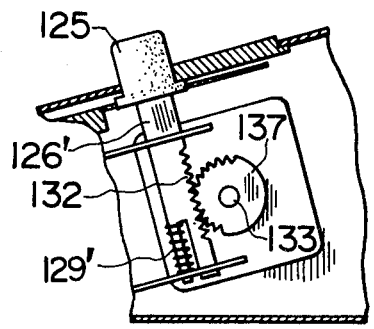
Figure 20:
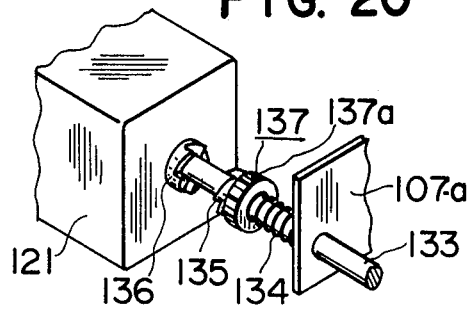

Variation, FIGS. 19 and 20

One variation of means for rotating the indicator 121 will be described with reference to FIGS. 19 and 20. Reference numeral 126' denotes a pushbutton lever; 132, a rack formed on the pushbutton lever 126'; 129', a coiled spring; and 137, a clutch gear having teeth 137a which engages with the rack 132 when the pushbutton 125 is depressed. The clutch gear 137 is slidably carried by the shaft 133 of the indicator 121 and is normally pressed against the side surface thereof under the force of a coiled spring 134 loaded between the frame 107a and the clutch gear 137. A saw-toothed projection 135 on the side surface of the clutch gear 137 on the side of the indicator 121 is adapted to engage with a mating saw-toothed projection 136 on the side surface of the indicator 121 only when the clutch gear 137 rotates in one direction, but not to engage with the projection 136 when the clutch gear 137 rotates in the other direction. When the pushbutton 125 is depressed, the indicator 121 is rotated, and when the pushbutton lever 126 is returned to its initial position under the force of the coiled spring 129, the projection 135 slips over the projection 136 so that the indicator will not be rotated.

Referring back to FIGS. 15 and 16 the shaft 123 of the indicator 121 is interposed between the pair of leaf springs 124a and 124b, the indicator 121 is not rotated unless the rotational force overcomes the forces of the springs 124a and 124b as shown in FIG. 16, and when the indicator 121 is rotated through 90°, it may be securely arrested by the springs 124a and 124b.

Referring back to FIG. 11, reference numeral 131 denotes a window.

The advantage of the second embodiment described hereinabove over the first embodiment resides in the fact that the selection switch is positively rotated in synchronism with the rotation of the indicator 121 because the switch is disposed coaxially thereof, so that the erratic indication preventive means of the first embodiment may be eliminated.

What is claimed is:

1. In a food processing apparatus having means rotatably acting on foodstuffs for processing the foodstuffs; and a motor for driving said rotatable processing means, apparatus for controlling the operation of said processing means, comprising: a selection switch for selecting one of $n$-step speeds of said motor; a rotatable indicator in the form of a prism having $n$ side surfaces in parallel with the axis thereof, each of said $n$ side surfaces having names of food marked thereupon which are intended to be processed at each of said $n$-step speeds of the motor; means for rotating said indicator to bring one of said side surfaces to an indication position; and means for operatively coupling said selection switch to said indicator to switch said selection switch to select the speed of the motor corresponding to the names of food marked upon the side surface of said indicator brought to said indication position.

2. A food processing control apparatus according to claim 1, further comprising: a timer for setting a time interval during which said motor is driven; and a pointer operatively coupled to said timer and being slidable in a direction parallel with the axis of rotation of said indicator over the side surface of said indicator located in the indication position for indicating a time interval set by said timer on said side surface, each of the names of food marked upon each of said side surfaces of the indicator being arranged in a corresponding relationship with a time interval to be set by said timer which is predetermined to be an optimum processing time for the associated food.

3. A food processing control apparatus according to claim 2, wherein: said selection switch is of the rotary type including a rotatable shaft; and said means for operatively coupling said selection switch to said indicator comprises an actuating disk securely fixed to the shaft of said selection switch and provided with a number of $n$ actuating pins projecting therefrom in parallel with the axis of said selector switch shaft and in circumferentially equi-spaced relation with each other, said indicator being disposed with its axis in parallel with the axis of the selector switch shaft and provided with a number of $n$ actuating pins projected therefrom in parallel with the axis of the indicator and in circumferentially equi-spaced relation with each other, a slider extending between said selection switch and said indicator, means for sliding said slider between two positions, two levers pivoted to the opposite end portions of said slider, stopper means provided on said slider for preventing each lever from rotating in one direction, said levers engaging with one of actuating pins of said actuating disk and one of actuating pins of said indicator respectively to rotate said selection switch and said indicator through an angle equivalent to $360°/n$ when said slider is moved from one of said positions to the other position.

4. A food processing control apparatus according to claim 2, wherein: said selection switch is of the rotary type and disposed with its axis in parallel with the axis of said indicator; and said means for operatively coupling said selection switch to said indicator comprises a slider extending between said selection switch and said indicator, means for sliding said slider between two positions, means for operatively connecting said slider to said selection switch and said indicator only when said slider slides from one of said positions to the other position so as to rotate said selection switch and said indicator through an angle equivalent to $360°/n$, an engaging portion comprising teeth formed along one edge of said slider, the length of said engaging portion being less than the sliding distance of said slider, an engaging pawl pivoted to a stationary member adjacent to the mid point of said sliding distance and having a pointed end portion which engages said engaging portion of said slider, and means for biasing said engaging pawl toward a position substantially perpendicular to the direction of sliding movement of said slider, the length between the stationary pivot member and the pointed end of said engaging pawl being longer than that of the perpendicular from the stationary pivot member to the trough level of said teeth of said slider.

5. In a food processing apparatus having means rotatably acting on foodstuffs for processing the foodstuffs; and a motor for driving said rotatable processing means, apparatus for controlling the operation of said food processing means, comprising: a rotary type selection switch for selecting one of $n$-step speeds of said motor; a rotatable indicator in the form of a prism fixed to a rotatable shaft and having $n$ side surfaces in parallel with the axis thereof corresponding to said $n$-step speeds of the motor respectively and being disposed in coaxial relation with said selection switch so as to rotate in unison with the movable contact of said selection switch; operating means for rotating said indicator through an angle equivalent to $360°/n$ upon every operation so as to bring one of said side surfaces to an indication position; a timer for setting a time interval during which said motor is driven; a pointer operatively coupled to said timer and being slidable in a direction parallel with the axis of rotation of said indicator over the side surface of said indicator to an indication position for indicating a time interval set by said timer on said side surface, each of said $n$ side surfaces having names of food marked thereupon which are intended to be processed at the speed of the motor corresponding to the associated side surface, each of the names of food marked upon each of said side surfaces being arranged in a corresponding relationship with a time interval to be set by said timer which is predetermined to be an optimum processing time for the associated food.

6. A food processing control apparatus according to claim 5, wherein said operating means for rotating said indicator comprises: a clutch gear rotatably fitted over the shaft of said indicator and biased to move toward said indicator along the shaft thereof, said clutch gear engaging said indicator only in one direction of rotation thereof, and a pushbutton lever having a rack which engages teeth formed on the periphery of said clutch gear for rotating said clutch gear.

7. A food processing control apparatus according to claim 5, wherein said operating means for rotating said indicator comprises a pushbutton lever extending near the shaft of said indicator and being reciprocatively slidable between two positions in a direction perpendicular to the shaft of said indicator, a cam securely fixed to the shaft of said indicator and provided with $n$ lobes, an actuating rod slidably mounted on said pushbutton lever and biased to move toward said cam in a direction substantially perpendicular to the direction of movement of said pushbutton lever for engagement with one of said lobes, each of said lobes being formed in such a configuration that when said pushbutton lever is moved toward one of said positions said cam is rotated through an angle equivalent to $360°/n$ by said actuating rod in engagement with the associated lobe and when said pushbutton lever is moved toward the other position said actuating rod is retracted without imparting rotational movement to said cam.

8. A food processing control apparatus according to claim 7, wherein said shaft of the indicator is provided with $n$ side surfaces in parallel with the axis thereof at one end portion thereof and a pair of leaf springs are disposed in opposite axial relation with each other and resiliently interposing said end portion of the shaft therebetween.

9. In a food processing apparatus having means rotatably acting on food for processing the food, a motor for driving said rotatable processing means, and a casing for housing therein said motor, apparatus for controlling the operation of said food processing means, comprising: a control panel detachably attached to said casing, said control panel having mounted thereupon a selection switch for selecting one of $n$-step speeds of said motor; means for actuating said selection switch; a rotatable indicator having a number of $n$ indicating surfaces in parallel with the axis thereof and operatively coupled to said selection switch to bring to an indication position one of said $n$ indicating surfaces corresponding to the speed of said motor selected by said selection switch; a timer for setting a time interval during which said motor is driven; means for actuating said timer; and a pointer operatively coupled to said timer and slidable in a direction parallel with the axis of rotation of said indicator for indicating a time interval set by said timer over the side surface of said indicator located in the indication position.

* * * * *